United States Patent [19]
Tamagawa

[11] Patent Number: 5,773,923
[45] Date of Patent: Jun. 30, 1998

[54] X-RAY IMAGE INTENSIFIER TUBE

[75] Inventor: Fumiyasu Tamagawa, Otawara, Japan

[73] Assignee: Kabushiki Kaisha Toshiba, Kawasaki, Japan

[21] Appl. No.: 738,285

[22] Filed: Oct. 25, 1996

[30] Foreign Application Priority Data

Oct. 27, 1995 [JP] Japan .................................. 7-280277
Oct. 15, 1996 [JP] Japan .................................. 8-272312

[51] Int. Cl.$^6$ .................................................. H01J 31/00
[52] U.S. Cl. ........................... 313/371; 315/480; 315/525
[58] Field of Search ..................................... 313/371, 523, 313/524, 525, 469, 479, 480, 110

[56] References Cited

U.S. PATENT DOCUMENTS

| | | |
|---|---|---|
| 2,477,329 | 7/1949 | De Gier et al. . |
| 2,676,109 | 4/1954 | Barnes et al. . |
| 3,422,298 | 1/1969 | De Gier . |
| 3,854,964 | 12/1974 | Thomas et al. ........................ 313/480 |
| 4,277,286 | 7/1981 | Boyd et al. ............................. 313/480 |
| 4,520,115 | 5/1985 | Speit et al. . |
| 5,468,692 | 11/1995 | Boek et al. ............................ 313/480 |

FOREIGN PATENT DOCUMENTS

| | | |
|---|---|---|
| 1074358 | 10/1954 | France . |
| 2 531 064 | 2/1984 | France . |
| 2688939 | 9/1993 | France . |
| 1-103932 | 4/1989 | Japan . |
| 3-12337 | 1/1991 | Japan . |
| 2 185 012 | 7/1987 | United Kingdom . |

OTHER PUBLICATIONS

"Glass Handbook" S. Sakuhana et al, Jul. 15, 1977 p. 118.

*Primary Examiner*—George M. Dombroski
*Assistant Examiner*—Harshad Patel
*Attorney, Agent, or Firm*—Cushman Darby & Cushman IP Group of Pillsbury Madison & Sutro, LLP

[57] ABSTRACT

An x-ray image intensifier tube includes at least an output section in which a borosilicate glass containing 0.01 to 5% by weight of cerium oxide is used as a glass substrate.

8 Claims, 5 Drawing Sheets

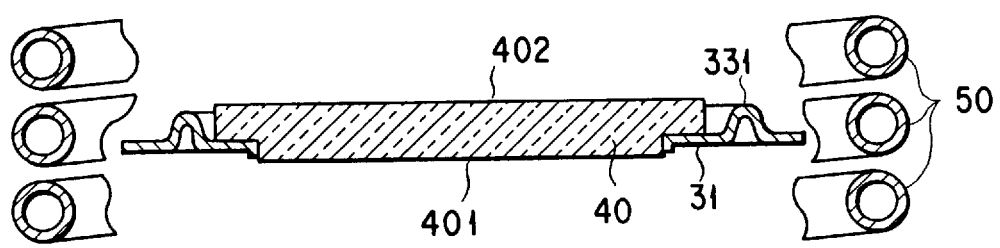
F I G. 5
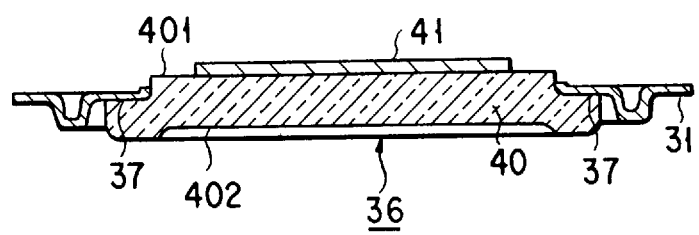
F I G. 6

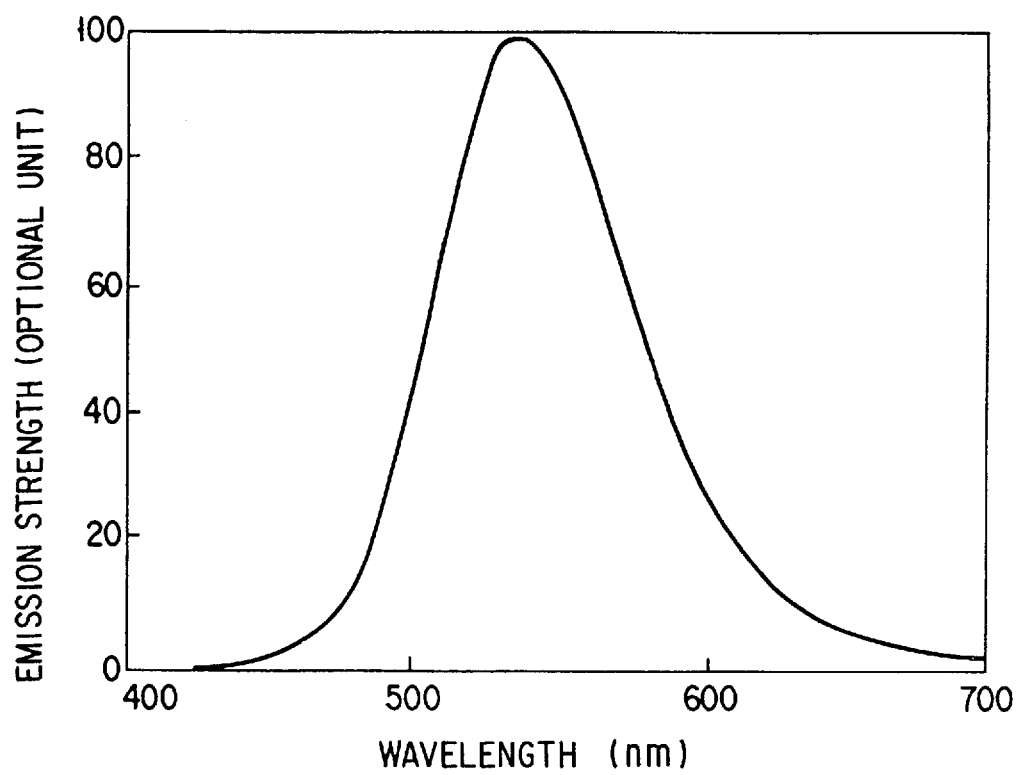
F I G. 9

X-RAY IMAGE INTENSIFIER TUBE

BACKGROUND OF THE INVENTION

1. Field of the Invention

The present invention relates to an X-ray image intensifier tube which permits intensifying and converting an X-ray image into an image of visible light.

2. Description of the Related Art

An X-ray image intensifier tube, which permits converting an X-ray image transmitted through a subject into an optical image of visible light, is used effectively as, for example, an X-ray diagnostic apparatus in a medical field.

FIG. 1 schematically shows a general X-ray image intensifier tube photographing system. As shown in the drawing, the X-ray image intensifier tube 10 comprises a vacuum envelope 12, an input screen 13a positioned inside of an X-ray input section 13 arranged on one side of the vacuum envelope 12, and an optical image output section 16 arranged on the other side of the vacuum envelope 12. A plurality of focusing electrodes 14 and anode 15 are arranged between the input section 13 and output section 16. An X-ray image emitted from an X-ray source 11 runs through a subject 17 to impinge the input screen 13a, with the result that an X-ray image is converted into an electron beam image. The electron beam image is focused and accelerated by the focusing electrodes 14 and accelerated by the anode 15 so as to form the optical image on the output section 16. It should be noted that the electron beam image formed in the input screen strikes a phosphor layer formed in the output section 16 to cause light emission from the phosphor layer, with the result that the electron beam image is converted into an optical image.

FIG. 2 shows how an electron beam image is converted into an optical image in the output section 16. As seen from the drawing, the output section 16 comprises a glass substrate 221, a phosphor layer 222 coated on the inner surface of the glass substrate 221, and a metal ring 21 for hermetically fixing the glass substrate 221 to the vacuum envelope 12 for the sealing purpose. The glass substrate 221 is formed of, for example, a borosilicate glass. On the other hand, an iron alloy such as covar (trade name) having a thermal expansion coefficient equal to that of the glass substrate 221 is used as the sealing metal, i.e., the metal ring 21. It should be noted that a metal back film formed by vapor deposition of aluminum is covered the phosphor layer 222 so as to form an output screen 22.

In the X-ray image intensifier tube having the output section constructed as described above, an electron beam 23 emitted from, for example, an input screen is accelerated and focused by an electron lens arranged within the vacuum envelope and, then, strikes the phosphor layer 222 of the output screen 22. Further, the electron beam striking the phosphor layer 222 is converted into a visible light 24, which is taken to the outside through the glass substrate 221. At the same time, when the electron beam 23 strikes the phosphor, X-ray or bremsstrahlung 25 is generated so as to strike the glass substrate 221. Generation of the bremsstrahlung 25 brings about a problem in the output section i.e., that the glass substrate 221 is colored, leading to a lowered light transmittance. Coloring or browning of the glass substrate in the output section causes reduction in the brightness of the output section. Also, the reduction in the brightness of the output section is one of the main reasons for the reduction in the conversion factor or the sensitivity of the X-ray image intensifier tube. Further, the X-ray generation tends to color the phosphor layer itself in some cases.

The glass coloring caused by the X-ray or bremsstrahlung striking is generally called an X-ray browning. To be more specific, the X-ray browning represents the phenomenon that traces of impurity components of glass are excited by the action of an X-ray so as to bring about an electron migration between oxidation-reduction pairs and, thus, to generate color centers serving to absorb visible lights.

The borosilicate glass used as a glass substrate contains as main components silicon oxide ($SiO_2$), boron oxide ($B_2O_3$), and aluminum oxide ($Al_2O_3$), and as traces of auxiliary components potassium oxide ($K_2O$), lithium oxide ($Li_2O$), sodium oxide ($Na_2O$), arsenic oxide ($As_2O_3$) and antimony oxide ($Sb_2O_3$). The traces of auxiliary components capable of browning the glass include $As_2O_3$ and $Sb_2O_3$. These $As_2O_3$ and $Sb_2O_3$ are added as a clarifier for defoaming during the glass manufacturing process. When irradiated with an X-ray, As and Sb form color centers, which mainly cause reduction of light transmittance. In short, it was impossible in the past to obtain an X-ray image intensifier tube which permits sufficiently suppressing of the browning of the glass substrate.

It is possible for the X-ray browning to take place in the panels of other display apparatuses such as a color CRT (cathode ray tube). Of course, the panel of the color CRT quite differs from the glass substrate included in the output section of an X-ray image intensifier tube in the material used and required properties thereof. When it comes to, for example, a color CRT, the panel is required to exhibit an X-ray inhibiting property so as to prevent the bremsstrahlung generated from the phosphor screen or a shadow mask on the inner surface of panel from leaking to the outside. To meet this requirement, traces of auxiliary components having a high mass absorption coefficient such as BaO, SrO and PbO are added to glass which contains $SiO_2$ as a main component. It should be noted in particular that Pb, which is the most excellent X-ray absorbing component, is defective in that the X-ray browning is likely to be brought about. Measures for overcoming this difficulty are proposed in, for example, Japanese Patent Disclosure Nos. 1-103932and 3-12337. Specifically, it is proposed to add traces of $CeO_2$ to a $SiO_2$-based glass as a measure for suppressing, without using Pb, the browning of the panel included in the color CRT.

SUMMARY OF THE INVENTION

An object of the present invention, which has been achieved in view of the situation described above, is to provide an X-ray image intensifier tube of a high sensitivity, which permits suppression of the browning of a glass substrate included in the output section so as to prevent the brightness of the output section from being lowered.

According to one embodiment of the present invention, there is provided an X-ray image intensifier tube, comprising a vacuum envelope, an input screen arranged on the X-ray incident side of the vacuum envelope for converting an X-ray image into an electron beam image, electrodes arranged within the vacuum envelope for accelerating and focusing the electron beam image, a glass substrate hermetically bonded to the vacuum envelope by using a metallic sealing material, and an output screen including a phosphor layer formed on the inner surface of the glass substrate, wherein the glass substrate is formed of a borosilicate glass containing 0.1 to 5% by weight of cerium oxide.

The X-ray image intensifier tube of the present invention permits suppressing of the browning of the glass substrate included in the output section during the use over a long period of time, with the result that the brightness of the output section is unlikely to be lowered. In other words, the X-ray image intensifier tube exhibits a high sensitivity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 shows how a sealing metal ring is bonded to the glass substrate;

FIG. 6 shows how a phosphor layer is formed on the glass substrate;

FIG. 9 shows the emission spectrum of a ZnS:Cu,Al phosphor.

DETAILED DESCRIPTION OF THE PREFERRED EMBODIMENTS

The present inventor has conducted extensive research in an attempt to suppress the browning of a glass substrate included in the output section of an X-ray image intensifier tube. As a result, it has been found that the browning of the glass substrate can be effectively suppressed by adding $CeO_2$, which exhibits a capability of absorbing a suitable amount of ultraviolet light, to the borosilicate glass.

According to the present invention, there is provided an X-ray image intensifier tube, comprising a vacuum envelope, an input section arranged on the X-ray incident side of said vacuum envelope for converting an X-ray image into an electron beam image, an electrode arranged within the vacuum envelope for accelerating and focusing the electron beam image, a glass substrate hermetically bonded to the vacuum envelope by using a metallic sealing material, and an output section including a phosphor layer formed on the inner surface of said glass substrate, wherein said glass substrate is formed of a borosilicate glass containing 0.1 to 5% by weight of cerium oxide.

Figure 1:
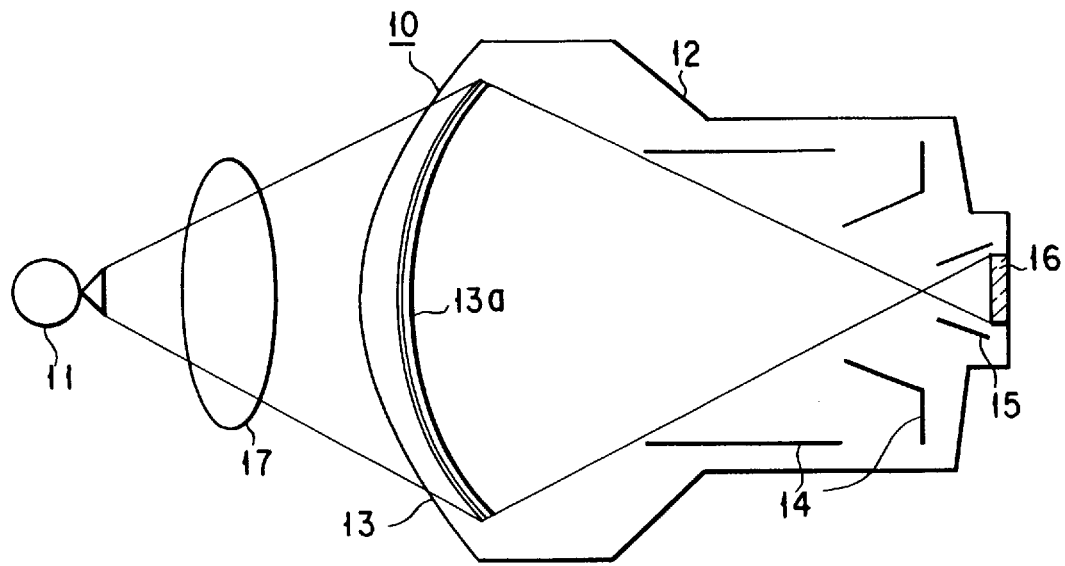
FIG. 1 schematically shows the construction of a general X-ray image intensifier tube.
Figure 2:
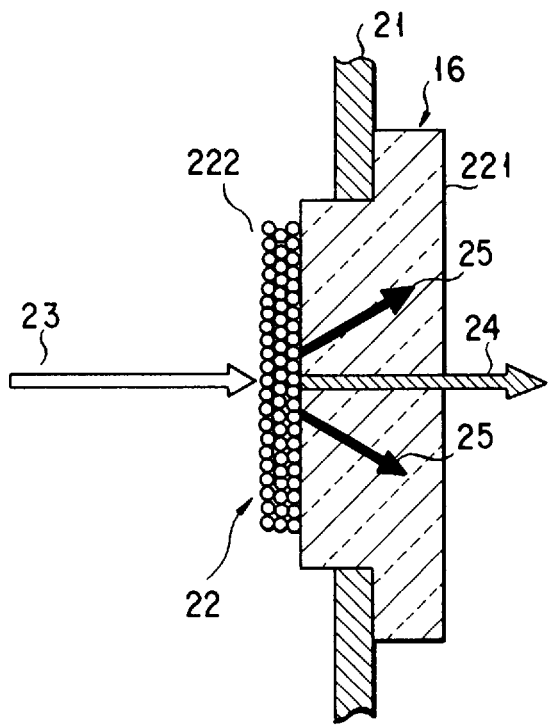
FIG. 2 schematically shows how an electron beam image is converted into a visible image in an X-ray image intensifier tube.
Figure 3:
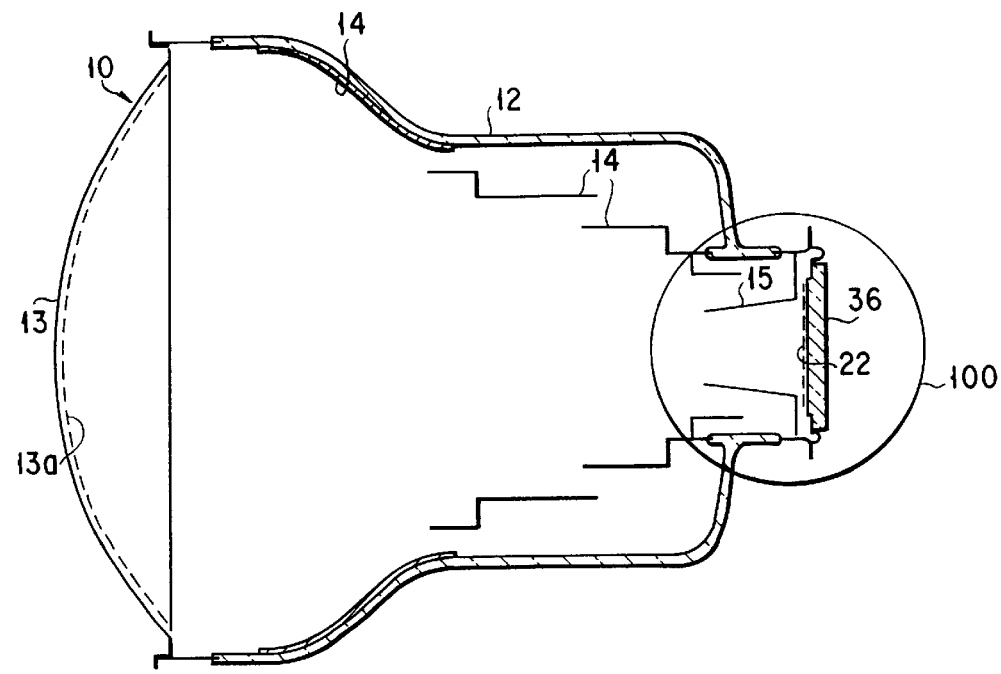
FIG. 3 schematically shows the construction of an X-ray image intensifier tube according to one embodiment of the present invention.

The X-ray image intensifier tube of the present invention will now be described in more detail with reference to the accompanying drawings. Specifically, FIG. 3 schematically shows an X-ray image intensifier tube according to one embodiment of the present invention. As shown in the drawing, the X-ray image intensifier tube 10 of the present invention comprises a vacuum envelope 12, an X-ray input section 13, an output section 36, a plurality of focusing electrodes 14 and, for example, a cylindrical anode 15. The input section 13 and output section 36 are mounted to the vacuum envelope 12. On the other hand, the focusing electrodes 14 are arranged to extend along the inner wall of the vacuum envelope 12 in a region between the input section 13 and the output section 36. An X-ray input window of the input section 13 is made of, for example, an aluminum alloy. It is seen that an input screen 13a is formed on the inner surface of the input window 13.

Figure 4:
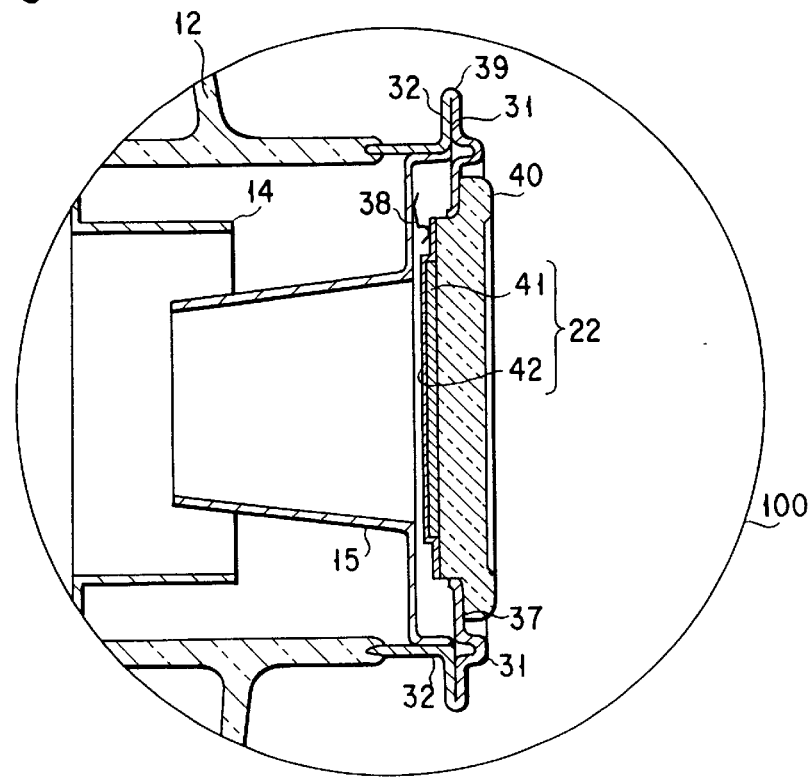
FIG. 4 shows in a magnified fashion the output section included in the X-ray image intensifier tube shown in FIG. 3.

FIG. 4 shows in a magnified fashion the region around the output section 36, which is surrounded by a circle 100 in FIG. 3. As seen from the drawing, the output section comprises an output screen 22 comprising a glass substrate 40, a phosphor layer 41 coated on the input side of the substrate 40, a metal back film 42, e.g., an aluminum thin film, covering the phosphor layer 41 are formed by means of vapor deposition, and sealing metal rings 31 and 32 for hermetically bonding the periphery of the glass substrate 40 to the output portion the vacuum envelope 12.

FIG. 5 exemplifies how to bond the sealing metal ring 31 to the glass substrate 40 in the output section. In the first step, the glass substrate 40 of a predetermined thickness is prepared. The glass substrate 40 used in the present invention is formed of a borosilicate glass containing 0.1 to 5% by weight of cerium oxide. The thermal expansion coefficient of the borosilicate glass should desirably fall within a range of between $45 \times 10^{-7}/°C$. and $62 \times 10^{-7}/°C$.

In the next step, the sealing metal ring 31 is arranged along the outer periphery of the glass substrate 40. As shown in FIG. 5, the sealing metal ring 31 has a waved portion 331 so as to permit the ring 31 to absorb stress and to prevent the ring 31 from being bent, e.g., twisted. It should be noted that, before arrangement of the sealing metal ring 31, an oxide film is formed on at least that portion of the outer periphery of the glass substrate 40 which is brought into contact with the sealing metal ring 31 so as to ensure a hermetic fusion of the ring 31 to the glass substrate 40.

After arrangement of the sealing metal ring 31 as desired, a heating means such as a high frequency induction heating coil 50 is arranged to surround the contact region between the glass substrate and the sealing metal ring 31. The sealing metal ring 31 is heated by high-frequency energy from the heating coil so as to fuse the glass substrate in contact with the ring 31. It should be noted that, when that region of the glass substrate 40 which is in contact with the sealing metal ring 31 is fused or melted to some extent, the glass substrate 40 is pushed from above against the sealing metal ring 31. As a result, the glass substrate 40 is slightly moved downward by, for example, its own weight, except the peripheral region supported by the sealing metal ring 31. It follows that the position of a lower surface 401 of the glass substrate 40 is lowered so as to cause an upper surface 402 of the glass substrate 40 to be recessed. Under this condition, the glass is bonded to the sealing metal ring. After the cooling, a hermetic bonding is achieved sufficiently at the bonding portion 37 between the sealing metal ring 31 and the glass substrate 40.

The sealing metal ring 31 should desirably be formed of a metal or an iron alloy, e.g., Kovar, having a thermal expansion coefficient falling within a range of between $45 \times 10^{-7}/°C$. and $62 \times 10^{-7}/°C$. To be more specific, it is desirable for the sealing metal ring 31 to be formed of a metal or alloy having a thermal expansion coefficient close to that of the glass substrate, e.g., a thermal expansion coefficient falling within a range of ±10% of that of the glass substrate.

FIG. 6 shows how a phosphor layer is formed on the glass substrate. As apparent from the drawing, the glass substrate hermetically bonded by the method shown in FIG. 5 is turned upside down, followed by forming a phosphor layer 41 consisting of such as a zinc sulfide phosphor coactivated by copper and aluminum, i.e., ZnS:Cu, Al, having a particle average of about 1.2 μm, on the surface 401 of the glass substrate 40. The phosphor layer 41 is formed by a settling method. The phosphor layer has a thickness of about 6 μm. Further, an aluminum thin film is formed on the surface of the phosphor layer 41 by means of vapor deposition.

In the next step, the position of the sealing metal ring 31 of the output section 36 thus formed is aligned with the position of the sealing metal ring 32, as shown in FIG. 4, followed by bonding the outer peripheral portions of these sealing metal rings 31 and 32 by means of arc welding at the portion 39. It should be noted that the metal back film 42 is electrically connected to each of the anode 15 and the sealing metal rings via a conductive finger 38.

In this embodiment, the sealing metal ring 31 is bonded to the glass substrate 40 by means of fusing or melting. Alternatively, however, it is also possible to arrange the sealing metal ring 31 to surround the glass substrate 40 in the first step, followed by applying a solder glass daubing to cover a region extending from the circumferential peripheral portion of the sealing metal ring 31 to a required portion of the glass substrate 40. In this case, the coating is heated within, for example, a heating furnace to melt the coating, followed by cooling the melt so as to achieve a desired bonding.

As already described, a $CeO_2$-containing borosilicate glass is used for forming the glass substrate 40 in the present invention. Concerning the glass substrate, the present inventor has conducted an experiment as follows:

I) Relationship between $CeO_2$ content of $CeO_2$-containing Borosilicate Glass and Initial Transmittance of the Glass:

Glass substrates included in X-ray image intensifier tubes of the construction shown in the drawings were prepared by using borosilicate glass substrates with varied contents of $CeO_2$, followed by measuring the initial transmittance of the glass substrate by using a light beam having a peak value in the vicinity of about 530 nm.

Figure 7:
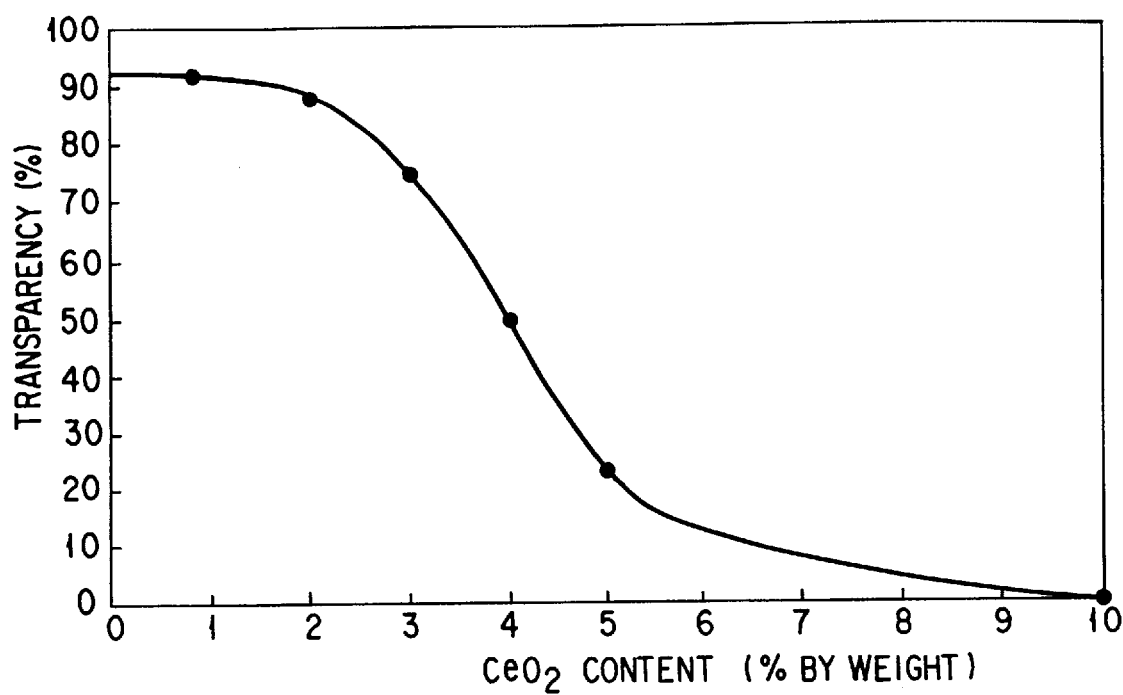
FIG. 7 is a graph showing the relationship between the initial transmittance and the $CeO_2$ content of the borosilicate glass substrate.

FIG. 7 is a graph showing the result with respect to the relationship between the $CeO_2$ content of the borosilicate glass substrate and the initial transmittance. The graph clearly shows that, if the $CeO_2$ content exceeds 5% by weight, the initial transmittance is rendered lower than 25%, resulting in failure to obtain a practically satisfactory brightness, though the contrast is satisfactory. Incidentally, if the $CeO_2$ content is less than 0.1% by weight, it is impossible to obtain a sufficient effect of preventing an X-ray browning problem. It follows that the $CeO_2$ content of the borosilicate glass substrate included in the X-ray image intensifier tube of the present invention should fall within a range of between 0.1 and 5.0% by weight, preferably between 0.3 and 4% by weight.

Figure 8:
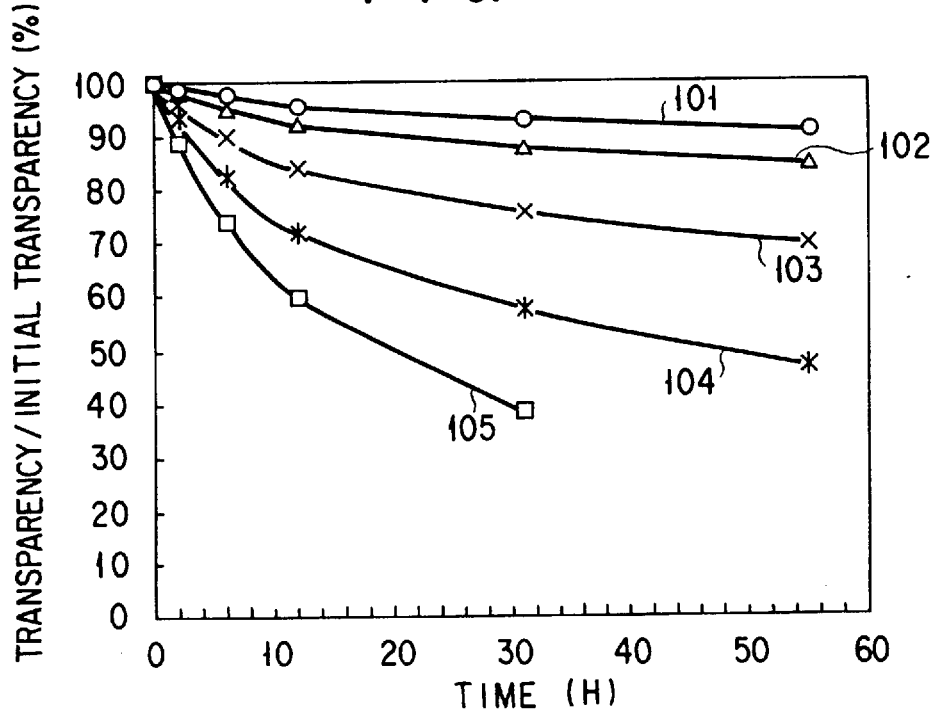
FIG. 8 is a graph showing the change with time in the transmittance of a $CeO_2$-containing borosilicate glass substrate.

II) Irradiation of $CeO_2$-containing Borosilicate Glass Substrate with X-ray:

Borosilicate glass substrates with varied $CeO_2$ contents were compulsorily irradiated with X-rays in an attempt to look into the effect produced by the X-ray irradiation. FIG. 8 is a graph showing the changes with time in the ratio of the transmittance to the initial transmittance of light through the substrate. Table 1 below shows the compositions of the borosilicate glass substrates used in this experiment:

TABLE 1

| Sample No. | Components (% by weight) | | | | | | | | | |
|---|---|---|---|---|---|---|---|---|---|---|
| | $SiO_2$ | $B_2O_3$ | $K_2O$ | $Al_2O_3$ | $Li_2O$ | $Na_2O$ | $As_2O_3$ | $Sb_2O_3$ | $Ce_2O$ | Others |
| 101 | 66.7 | 18.9 | 8.03 | 2.88 | 0.81 | 0.44 | — | — | 1.98 | 0.26 |
| 102 | 67.5 | 19.2 | 8.08 | 2.90 | 0.82 | 0.44 | — | — | 0.80 | 0.26 |
| 103 | 68.0 | 19.0 | 8.40 | 3.10 | 0.80 | 0.20 | — | — | 0.30 | 0.20 |
| 104 | 65.3 | 18.0 | 6.04 | 7.10 | 0.88 | 2.30 | — | — | 0.10 | 0.28 |
| 105 | 67.3 | 19.1 | 8.07 | 2.90 | 0.82 | 0.44 | 0.65 | 0.46 | — | 0.26 |

It is clearly seen from Table 1 that the $CeO_2$ containing borosilicate glass for any of Samples Nos. 101 to 104 fall within the technical scope of the present invention. On the other hand, Sample No. 105, which constitutes a comparative example, is directed to a conventional glass substrate which does not contain $CeO_2$ and contains $As_2O_3$ and $Sb_2O_3$. The experimental data for these Samples Nos. 101 to 105 are shown in the graph of FIG. 8. The voltage of the X-ray tube used as an X-ray source in this experiment was 60 kV, and the X-ray dose was 420 R/min.

As apparent from the graph of FIG. 8, reduction with time in the brightness of the glass substrate was markedly suppressed in any of Samples Nos. 101 to 104 of the present invention, compared with the conventional glass substrate of Sample No. 105, which did not contain $CeO_2$. Further, it was visually confirmed that the glass substrate of Sample No. 105 had been clearly colored.

Clearly, the glass substrate used in the present invention produces an effect of sufficiently preventing X-ray browning. However, cerium itself absorbs the light components of ultraviolet region. Where $CeO_2$ is added to glass, the resultant glass composition tends to lower the transmittance of light of a short wavelength region. Also, where arsenic (As) is present together with Ce, the X-ray browning of the glass tends to be promoted. It follows that it is desirable to avoid the use of $CeO_2$ together with As or Sb. Further, As and Sb are harmful to the living environment of the human being, making it desirable to avoid using As and Sb as much as possible. Under the circumstances, the amount of arsenic oxide or antimony oxide contained in the glass substrate used in the present invention should fall within a range of between 0 and 2000 ppm, preferably between 0 and 1000 ppm, in terms of the produced effect. Incidentally, $CeO_2$ produces a defoaming effect and, thus, can be used as a clarifier in place of arsenic oxide and antimony oxide.

Zinc sulfide phosphor coactivated by copper and aluminum, i.e., ZnS:Cu,Al, is used in the present invention for forming the phosphor layer 37. The particular phosphor consists of 99.9% of ZnS, 0.024% of Al, 0.017% of Cu, and the balance of unavoidable impurities.

FIG. 9 shows the emission spectrum of the ZnS:Cu,Al phosphor used in the present invention. As seen from FIG. 9, the phosphor used in the present invention is a green light-emitting phosphor having a peak intensity of the emitted light at a wavelength of about 530 nm, which well conforms with the sensitivity to the receiving light of, for example, a CCD camera. It was customary in the past to use a silver-activated zinc cadmium sulfide phosphor, (Cd,Zn)S:Ag, as a green light-emitting phosphor. However, Cd contained in the conventional phosphor is harmful to the human health, and tends to cause browning of the phosphor layer upon irradiation with an X-ray.

III) Life Test for Cd-containing Phosphors and Phosphors free from Cd:

A compulsory life test was applied to each of a ZnS:Cu,Al phosphor layer and a (Cd,Zn)S:Ag phosphor layer under an X-ray tube voltage of 60 kV and an incident dose on the X-ray image intensifier tube of 2 R/min. Further, the ratio of Cd to Zn contained in the (Cd,Zn)S:Ag phosphor layer was about 50:50. The compulsory life test was continued for 530 hours. The sensitivity of the ZnS:Cu,Al phosphor layer has been found to be superior to that of the (Cd,Zn)S:Ag phosphor layer by about 18 points, with the browning of the glass substrate excluded from the comparison.

In order to obtain a practical X-ray image intensifier tube small in browning, it is desirable to control the Cd content of the phosphor used in the present invention to fall within a range of between 0 and about 1000 ppm, preferably between 0 and 500 ppm.

As described above, the present invention provides an X-ray image intensifier tube which permits sufficient suppression of the browning of the glass substrate included in the output section of the tube. Further, the X-ray image intensifier tube of the present invention permits the problems of air pollution, water contamination, etc., to be solved by decreasing the amounts of arsenic and antimony contained in the glass substrate and the cadmium content of the phosphor layer.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An X-ray image intensifier tube, comprising:
    a vacuum envelope;
    an input screen arranged on an X-ray incident side of said vacuum envelope for converting an X-ray image into an electron beam image;
    at least one electrode arranged within the vacuum envelope for accelerating and focusing the electron beam image;
    a glass substrate hermetically bonded to the vacuum envelope with a sealing metal ring; and
    an output screen including a phosphor layer formed on the inner surface of said glass substrate,
    wherein said glass substrate is formed of a borosilicate glass containing 0.1 to 5% by weight of cerium oxide, and
    wherein each of said sealing metal ring and said glass substrate exhibits a thermal expansion coefficient within a range of between $45 \times 10^{-7}$/°C. and $62 \times 10^{-7}$/°C.

2. The X-ray image intensifier tube according to claim 1, wherein the cerium oxide content of said glass substrate falls within a range of between 0.3 and 4% by weight.

3. The X-ray image intensifier tube according to claim 2, wherein said sealing metal ring has a thermal expansion coefficient falling within a range of ±10% of that of said glass substrate.

4. The X-ray image intensifier tube according to claim 1, wherein said glass substrate contains arsenic oxide or antimony oxide in an amount of 0 to 2000 ppm.

5. The X-ray image intensifier tube according to claim 1, wherein said hermetic bonding between sealing metal ring and the glass substrate is achieved by using a solder glass.

6. The X-ray image intensifier tube according to claim 1, wherein said glass substrate contains 18.0 to 19.2% by weight of $B_2O_3$.

7. An X-ray image intensifier tube, comprising:
    a vacuum envelope;
    an input screen arranged on an X-ray incident side of said vacuum envelope for converting an X-ray image into an electron beam image;
    at least one electrode arranged within the vacuum envelope for accelerating and focusing the electron beam image;
    a glass substrate hermetically bonded to the vacuum envelope with a sealing metal ring; and
    an output screen including a phosphor layer formed on the inner surface of said glass substrate,
    wherein said glass substrate is formed of a borosilicate glass containing 0.1 to 5% by weight of cerium oxide,
    wherein said glass substrate is at least partially fused or melted to achieve said hermetic bonding with said sealing metal ring, and
    wherein each of said sealing meatal ring and said glass substrate exhibits a thermal expansion coefficient within a range of between $45 \times 10^{-7}$/°C. and $62 \times 10^{-7}$/°C.

8. An X-ray image intensifier tube, comprising:
    a vacuum envelope;
    an input screen arranged on an X-ray incident side of said vacuum envelope for converting an X-ray image into an electron beam image;
    at least one electrode arranged within the vacuum envelope for accelerating and focusing the electron beam image;
    a glass substrate hermetically bonded to the vacuum envelope with a sealing metal ring; and
    an output screen including a phosphor layer formed on the inner surface of said glass substrate,
    wherein said glass substrate is formed of a borosilicate glass containing 0.1 to 5% by weight of cerium oxide,
    wherein said glass substrate is at least partially fused or melted to achieve said hermetic bonding with said sealing metal ring,
    wherein each of said sealing meatal ring and said glass substrate exhibits a thermal expansion coefficient within a range of between $45 \times 10^{-7}$/°C. and $62 \times 10^{-7}$/°C., and
    wherein said phosphor layer contains mainly a zinc sulfide phosphor co-activated by aluminum and copper and also contains cadmium in an amount of 0 to 1000 ppm by weight.

* * * * *